United States Patent [19]

Baker

[11] Patent Number: 4,737,019
[45] Date of Patent: Apr. 12, 1988

[54] LIQUID CRYSTAL OPTICAL SWITCHING DEVICE HAVING MINIMIZED INTERNAL LIGHT PATH

[75] Inventor: Anthony P. Baker, New York, N.Y.

[73] Assignee: ITT Defense Communications, a division of ITT Corporation, Nutley, N.J.

[21] Appl. No.: 795,151

[22] Filed: Nov. 5, 1985

[51] Int. Cl.⁴ .................... G02F 1/133; G02B 6/42
[52] U.S. Cl. .................... 350/347 V; 350/96.18; 350/347 E; 350/416
[58] Field of Search ............... 350/347 R, 347 V, 416, 350/96.18, 347 E

[56] References Cited

U.S. PATENT DOCUMENTS

| | | |
|---|---|---|
| 3,963,310 | 6/1976 | Giallorenzi et al. ............ 350/347 V |
| 4,278,327 | 7/1981 | McMahon et al. ............. 350/347 R |
| 4,304,461 | 12/1981 | Stewart et al. ....................... 350/416 |
| 4,378,955 | 4/1983 | Bleha, Jr. et al. ............. 350/347 E |
| 4,411,495 | 10/1983 | Beni et al. ...................... 350/347 V |
| 4,556,288 | 12/1985 | Sekimura ........................ 350/347 V |

Primary Examiner—John K. Corbin
Assistant Examiner—Martin Lerner
Attorney, Agent, or Firm—Robert A. Walsh; Thomas N. Twomey; Mary C. Werner

[57] ABSTRACT

A liquid crystal optical switching device includes first and second transparent members configured to minimize both the path length and the number of internal reflections of a light beam traversing the device.

11 Claims, 3 Drawing Sheets

LIQUID CRYSTAL OPTICAL SWITCHING DEVICE HAVING MINIMIZED INTERNAL LIGHT PATH

CROSS-REFERENCE TO RELATED APPLICATIONS

This application is related to one, or more, of the following U.S. patent applications: Ser. Nos. 795,156; 795,152; 595,150; 795,155; 795,138; 795,148; 795,157; 795,154; 795,149; and 795,296 all filed on even date herewith. All of the above applications are assigned to the assignee hereof.

BACKGROUND OF THE INVENTION

The present invention generally relates to a liquid crystal optical switching device and, in particular, relates to such a switching device having a minimized internal light path.

The use of optical fibers as a telecommunication transmission medium has numerous advantages compared to existing telecommunication transmission media. For example, optical fibers can sustain signals having wider bandwidths and, hence, can convey larger quantities of information than existing media. Further, light waves are shorter than the conventional microwaves currently used in many existing telecommunication systems and thus a substantial reduction in the physical size of components is readily achievable. This size reduction further results in cost reductions for materials, packages and manufacturing. Still further, current optical fibers exhibit little or no electromagnetic or radio frequency radiation, thus there is no consequential impact on the surrounding environment.

To be viable, every telecommunication system must include some means for controllably redirecting a signal, or a portion thereof, to or from a transmission medium, or between one or more such media. In the case of an optical telecommunication system, the signal redirecting means is an optical switch. Conventionally, the majority of optical switches have been mechanical, although recently liquid crystal switches have been proposed.

In general, mechanical switches require relatively high driving power and are subject to wear, abrasion and fatigue. Further, mechanical switches are prone to failure after repeated use. In addition, since a rather small optical fiber is usually displaced from alignment with one port fiber into alignment with another port fiber, mechanical switches are expensive due to the very small tolerances required to ensure the proper alignments.

Advantageously, a liquid crystal optical switching device has no moving parts and is thus free from many of the drawbacks of mechanical switches. Liquid crystal optical switches have been discussed and described, inter alia, in U.S. Pat. Nos. 4,201,442 issued to McMahon et al. on May 6, 1980, 4,278,327 issued to McMahon et al. on July 14, 1981 and 4,385,799 issued to Soref on May 31, 1983. Therein, a variety of liquid crystal switches are discussed and described wherein optical fibers are attached to the angled side surfaces of a pair of trapezoidal prisms. The trapezoidal prisms are arranged with the bases thereof parallel and liquid crystal material is positioned therebetween.

Although the optical switches described in the above-referenced patents have some advantages over mechanical switches, i.e. no moving parts, these liquid crystal switches are both expensive and difficult to mass produce.

Specifically, each set of trapezoidal prisms must be precisely matched to ensure the exactness of the optical path, the trapezoidal prisms must also be optically flat to avoid detrimental light scattering at the surface and, in addition, must be optically pure to avoid internal light scattering. Light scattering and optical path inaccuracies can result in both signal loss and crosstalk. Further, the trapezoidal prisms must be precisely aligned to each other to avoid signal losses and crosstalk. Typically, the effect of any single misalignment worsens over the length of the light path thereafter. Finally, the devices require that each trapezoidal prism include four optically flat surfaces to accomodate at least one internal reflection at the prism/air interface opposite the base surface. The requirement for four optically flat surfaces to accomodate the internal reflection severely reduces the allowable tolerances on the positioning of the prisms to each other because of the limited length of the angled surfaces. That is, if the prisms are not precisely aligned to each other the assembly may not be useable since the side angle surfaces are so short that the fibers attached would be misaligned. In addition, such a configuration requires expensive and time consuming surface polishing and lapping processes and a very pure glass. As a result, these optical switches are quite impractical for an extensive optical telecommunication network.

Consequently, since a typical telecommunication network may include hundreds, if not thousands, of switching devices, a low cost, readily mass produced optical switching device is necessary to fully realize the advantages of an optical telecommunications system.

SUMMARY OF THE INVENTION

Accordingly, it is one object of the present invention to provide an optical switching device utilizing liquid crystal material that provides high performance and is amenable to high volume production techniques.

This object is accomplished, at least in part, by a liquid crystal optical switching device wherein both the internal light path and the number of internal reflections are minimized.

Other objects and advantages will become apparent to those skilled in the art from the following detailed description read in conjunction with the appended claims and the drawings attached hereto.

DETAILED DESCRIPTION OF THE INVENTION

Figure 1:
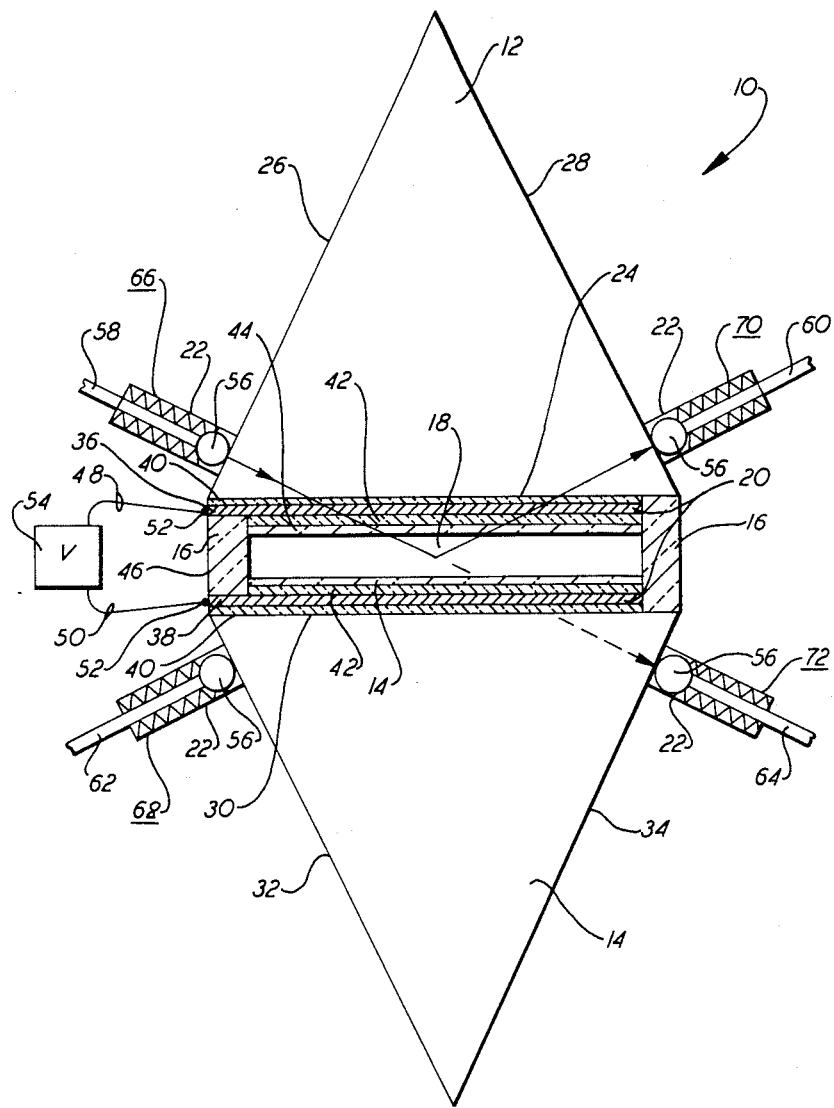
FIG. 1 is a cross sectional view, not drawn to scale, of a liquid crystal optical switching device embodying the principles of the present invention.

A liquid crystal optical switching device, generally indicated at 10 in the drawing and embodying the principles of the present invention, includes first and second transparent members, 12 and 14, respectively, means for retaining a liquid crystal material 18 between the first and second transparent members, 12 and 14, respectively, means 20 for sustaining an electromagnetic field in at least a portion of the liquid crystal material 18 and means 22 for attaching a plurality of optical fibers. As more fully discussed below, the optical fiber attaching means 22 and the first and second tranparent members, 12 and 14, respectively, are cooperatively configured to minimize the light path through the members, 12 and 14, as well as minimize the required number of optically flat surfaces thereof. Further, such a configuration results in a device 10 that is more amenable to mass production techniques.

In one preferred embodiment, the first transparent member 12 includes a base surface 24 and first and second side surfaces, 26 and 28, respectively. Preferably, the first and second side surfaces, 26 and 28, respectively, are disposed at an angle with the base surface 24 that is, at least, equal to the critical angle. Further, in one preferred embodiment, the first and second side surfaces, 26 and 28, respectively, constitute the equal sides of an isosceles triangle.

The second transparent member 14, is preferably, substantially identical to the first transparent member 12 and includes a base surface 30 and first and second side surfaces, 32 and 34, respectively. In the preferred device 10, the first and second transparent members, 12 and 14, respectively, are oriented with respect to each other such that the base surfaces, 24 and 30, respectively, thereof are proximate the liquid crystal material 18 retained therebetween. Preferably, the material of the first and second transparent members, 12 and 14, respectively, is machinable by conventional mass production techniques, for example, drilling, molding and milling. One particularly inexpensive material useful for the members, 12 and 14, is clear plastic. In fact, primarily because of the reduced internal light path and the minimized number of internal reflections, the surface flatness resulting from conventional plastic molding techniques is sufficient for low cost applications.

The liquid crystal retention means 16 can be any type of spacer formed of material that is inert to the selected liquid crystal material 18, for example, ordinary glass. In one implementation, the spacer is retained in position and acts to retain the first and second transparent members, 12 and 14, respectively, in their relative positions with respect to each other, by an epoxy. Preferably, for an extended operating life of the device 10, one factor in selecting the epoxy used is the inertness thereof to the liquid crystal material 18. In addition, it is preferred that the epoxy used is of a type that can be cured via ultraviolet heating.

The means 20 for sustaining an electromagnetic field includes in one embodiment, first and second electrodes, 36 and 38, respectively, spaced apart and overlying the base surfaces, 24 and 30, of the first and second transparent members, 12 and 14, respectively. In one alternative embodiment, the first and second electrodes, 36 and 38, respectively, can be interdigitated and overlie only one of the base surfaces, 24 or 30. The advantage of disposing an electrode, 36 and 38, over each base surface, 24 and 30, respectively, is that each transparent member, 12 and 14, respectively, can then be manufactured by an identical process. The advantage of using interdigitated electrodes is that, since the alteration of the liquid crystal optical properties is a surface phenomenon, a lower control voltage can be used. That is, the spacing between adjacent fingers of the first and second interdigitated electrodes can be made smaller than the thickness of the liquid crystal material 18. Hence, less voltage is required to create an electromagnetic field of a given strength between the fingers than the voltage required to create a comparable electromagnetic field across the liquid crystal material 18. In any event, the electrodes, 36 and 38, are made sufficiently thin so that, with respect to the light wavelength, to be switched, they are in fact transparent. Alternatively, the electromagnetic field can be induced without the use of the electrodes, 36 and 38, by impressing a magnetic field across the liquid crystal material 18.

In the preferred embodiment, 36 and 38, each electrode is spaced apart from the transparent member, 12 and 14, respectively, associated therewith by a means 42 for matching the index of refraction of the member, 12 or 14, to that of the electrode, 36 or 38, respectively. Further, each electrode, 36 and 38, is, preferably, spaced apart from the liquid crystal material 18 by a means 42 for matching the index of a refraction of the electrodes, 36 and 38, to that of the liquid crystal material 18. For example, a common clear plastic material typically has an index of refraction on the order of about 1.6, whereas a typical electrode, 36 and 38, such as Indium Tin Oxide (ITO) has an index of refraction of about 1.9 and a liquid crystal material 18 has an index of refraction upon the order of about 1.6. Hence, in order to avoid losses due to refraction at the interface between mismatched materials, the indices of refraction therebetween can be matched by a single layer of material having a graduated index of refraction or, alternatively, by a plurality of layers having different indices of refraction. The index of refraction matching, in one embodiment, is accomplished by techniques discussed and described in U.S. patent application Serial Number entitled LIQUID CRYSTAL CELL FOR USE IN AN OPTICAL SWITCH, filed on even date herewith and assigned to the assignee hereof Ser. No. 795,150. This application is incorporated herein by reference. Further, it is preferred that the surface of the means 42 adjacent the liquid crystal material 18 include a surfactant layer 44, such as 300 Angstrom of $S_iO$ to ensure the orientation of the liquid crystal molecules in the absence of an electromagnetic field. Other surfactants include polyvinyl alcohol or a polyimide. Alternatively, the liquid crystal material 18 could be doped to effect the molecular alignment.

Preferably, and regardless of the configuration of the disposition of the electrodes, 36 and 38, with respect to the base surfaces, 24 and 30, respectively, the electrodes, 36 and 38, extend to an edge 46 of the device 10 whereat control voltage leads, 48 and 50, can be connected thereto by, for example, an electrically conductive epoxy 52 or by any other convenient connection method. The leads, 48 and 50, can then be connected to a control voltage source 54.

The liquid crystal optical switching device 10 has, in one embodiment, a means 22 for receiving an optical fiber attached to each of the first and second surfaces, 26 and 28, 32 and 34, of the first and second transparent members, 12 and 14, respectively. The means 22 for receiving an optical fiber can be any conventional optical fiber receiving means and is attached flush to a first and second surfaces, 26 and 28, of each of the first and second transparent members, 12 and 14, respectively. The optical fiber receiving means 22 and the first and second surfaces, 26 and 28, 32 and 34, are cooperatively configured such that the only internal reflection occurs at the liquid crystal material 18/base surface, 24 and 30, interface. Each optical fiber receiving means 22 is, preferably, provided with a collimating lens 56, for example, a spherical or bead lens, having an anti-reflection coating and is epoxied in place by an index of refraction matching epoxy. A plurality of optical fibers, 58, 60, 62 and 64 are, subsequent to alignment, epoxied to the lenses 56, thereby ensuring permanent optical alignment thereof.

The device 10 as described above is readily amenable to mass production techniques due to the symmetry of the transparent members, 12 and 14. The minimized path length and lack of internal reflections not only reduce the internal scattering losses due to impurities but allow the device 10 to be made very much smaller than conventional liquid crystal switches having larger internal path lengths and more internal reflections. The members, 12 and 14, in the preferred embodiment, are essentially identical to each other and hence the matching thereamong is unnecessary, although, if desired, the optical flatness of the base surfaces, 24 and 30, of the members, 12 and 14, respectively, can be selected. However, as all the members, 12 and 14, are, preferably, fabricated by the same process such subsequent matching is not usually necessary.

The disposition of the electrodes, 36 and 38, and the index of refraction matching layers, 40 and 42, can also be performed by conventional disposition techniques on each member, 12 and 14, in a production line fashion using known vacuum disposition, or sputtering, techniques. Preferably, the electrodes, 36 and 38, are on the order of about 300 Angstroms thick. Preferably, the thickness of the electrodes, 36 and 38 are less than one quarter of wavelength of the light being switched. The optical fibers, 58, 60, 62 and 64, can also be attached either before or after the liquid crystal retaining step by using known optical fiber techniques. Preferably, each optical fiber, 58, 60, 62 and 64, is brought into contact with the bead, or spherical, lens 56. Upon alignment, a transparent index of refraction matching epoxy is poured into the attaching means 22 and cured. Hence, upon curing of the epoxy, the optical fibers, 58, 60, 62 and 64, are optically aligned and completely secured within attaching means 22.

In fact, because of the effectively triangular profile of the members, 12 and 14, at least one optical fiber attaching means 22 can be affixed to, for example, the first side surfaces, 26 and 32, respectively, before the members, 12 and 14, are affixed to each other via the means 16. Subsequently, the optical fiber attaching means 22 can be aligned and attached to the second side surfaces, 28 and 34. The extended length of the first and second side surfaces, 26 and 32 and 28 and 34, in contrast to the limited length of a trapezoidal profile, allows the means 22 to be placed where needed even if the base surfaces, 24 and 30, are considerably misaligned.

In one particular assembly method the liquid crystal portion of the switching device 10 is a discrete liquid crystal cell such as that discussed and described in the above-referenced patent application entitled LIQUID CRYSTAL CELL FOR USE IN AN OPTICAL SWITCH. In such a manufacturing method the discrete liquid crystal cell is secured on either side thereof to the base surfaces, 24 and 30, of the first and second transparent members, 12 and 14, respectively, by an index of refraction matching epoxy. Hence, in such a manufacturing technique only three parts need be assembled, two of being identical.

In one particular embodiment, the base surfaces, 24 and 30, have a length of about 1 centimeter. Further, each lens 56 is a spherical collimating lens having a diameter of about 1 millimeter. The liquid crystal material 18 can be stock number EM1132, manufactured and marketed by Merck & Co., Rahway, N.J., and is applied to a thickness of about 6 micrometers. In such a specific device the control voltage to effect switching is about 20 volts A.C. Such a device 10 is capable of accepting any sized optical fiber. Preferably, in order to increase the switching speed of the device 10 and decrease crosstalk, a bias voltage, less than the switching voltages, for example, about 1.5 volts A.C., is maintained across the electrodes, 36 and 38.

Figure 2A:
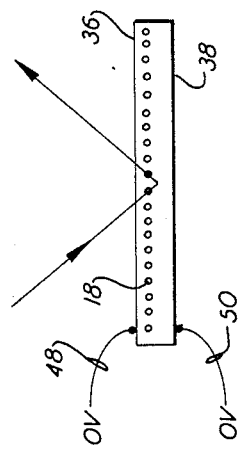
FIGS. 2A and 2B are ray tracing diagrams of the switching device shown in FIG. 1 utilizing parallel polarized light.
Figure 2B:
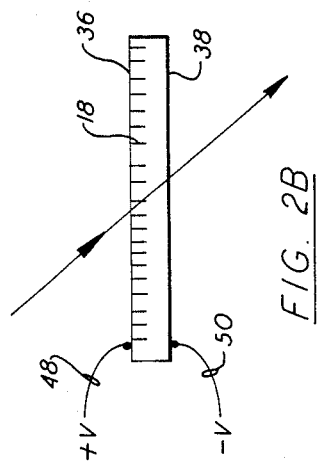

The device described herein operates to switch either parallel or perpendicularly polarized light. With reference to FIG. 2, the switch conditions for parallel polarized light are shown by the ray tracings thereof. With no voltage applied across the electrodes, 36 and 38, parallel light is reflected by the liquid crystal material 18 having homogenically ordered molecules. When the control voltage is applied as shown in FIG. 2B, the liquid crystal material 18 becomes homotropically ordered.

Figure 3A:
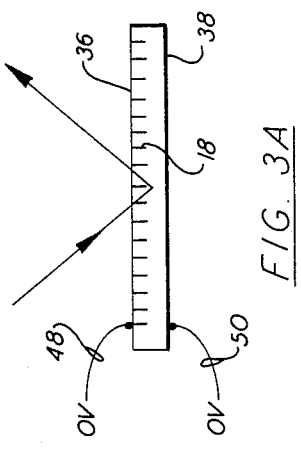
FIGS. 3A and 3B are ray tracing diagrams of the switching device shown in FIG. 1 with perpendicularly polarized light.
Figure 3B:
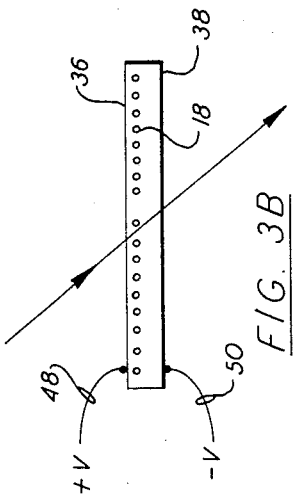

Similar ray tracings are shown in FIG. 3 for perpendicularly polarized light and similar voltage conditions. FIG. 3A refers to the path of perpendicularly polarized light when no voltage is applied to the electrodes. FIG. 3B represents the condition when the liquid crystal molecules are ordered.

The device 10, as described, includes first and second input ports, 66 and 68, respectively, and first and second output ports, 70 and 72, respectively, and is capable of switching any parallel or perpendicularly polarized light provided at the input ports, 66 and 68, between two output ports, 70 and 73 thereof. However, unless the incoming signal at an input port is completely parallel or perpendicularly polarized up to one half of the signal can be lost due to the ability of the device 10 to switch only a single polarization.

Figure 4A:
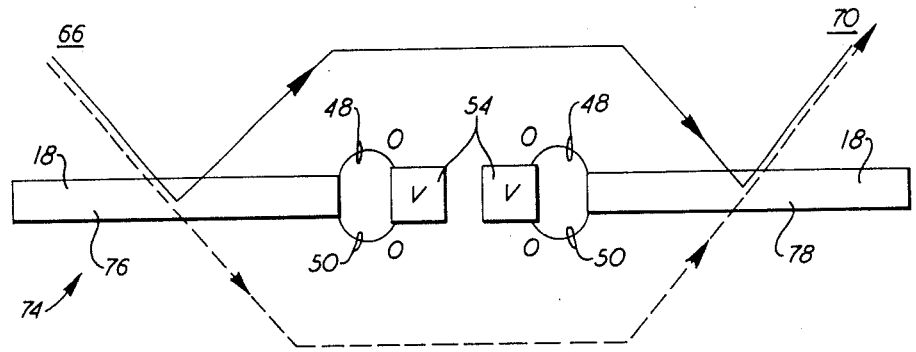
FIGS. 4A to 4C are ray tracing diagrams of an apparatus, embodying the principles of the present invention, for switching unpolarized light.
Figure 4B:
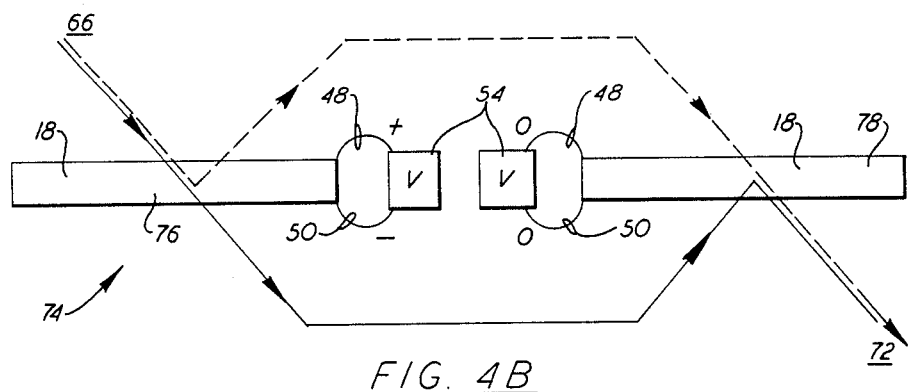
Figure 4C:
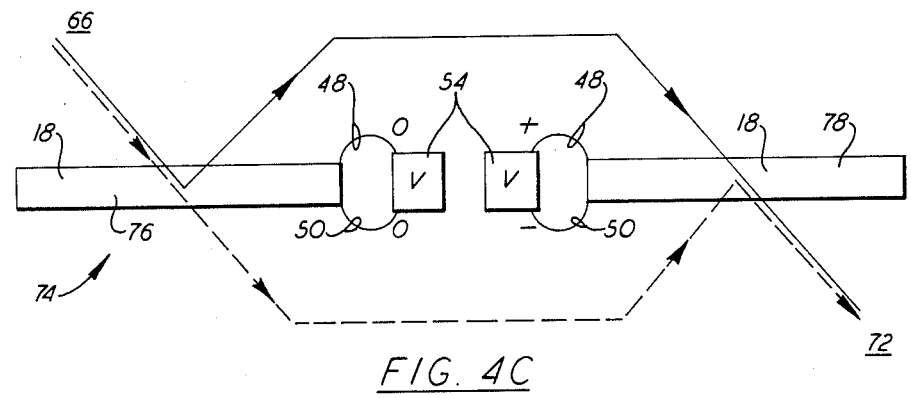

An apparatus, generally indicated at 74 in FIG. 4 and embodying the principles of the present invention, is provided and adapted to switch light containing both parallel and perpendicular polarizations without loss of signal. As shown in FIG. 4A, the apparatus 74 includes a first and a second device, 76 and 78, each being essentially identical to the device 10 shown in FIG. 1 and hence reference numerals are repeated in FIG. 4 for elements previously discussed. The ray tracings in FIG. 4 demonstrate the ability of the apparatus 74 to switch a light signal having both perpendicular and parallel polarizations between a first output port 70 and a second output port 72. In FIG. 4B the device 76 is powered, i.e., switched, whereas in FIG. 4C the device 78 is powered to effect the switching of the output signal from port 70 to port 72. In the ray tracings, the solid line ray trace paths represent the perpendicularly polarized portion of the input light signal whereas the dashed ray tracing represent the path of the parallel polarized portion of the incoming light signal.

It is assumed that the devices 10, 76 and 78, discussed throughout, at least with regard to the ray tracing shown in the Figures, includes a nematic liquid crystal material. Naturally, other types of liquid crystal materials, such as cholesteric or smectic, can also be used and other polarizations of light can also switched.

The device 10, 76 or 78, described herein is inexpensive and is easily produced by known mass production techniques. Further, the materials are inexpensive and the tolerances required are readily achievable by the known manufacturing techniques. Consequently, such an optical switching device 10, 76 or 78, even when used twice as in the apparatus 74, is readily adaptable for use throughout an entire telecommunications network.

Although the present device has been described with respect to specific embodiments it will be understood that other arrangements and configurations can also be derived here from that nevertheless do not depart from the spirit and scope of the present invention. Hence, the present invention is deemed limited only by the appended claims and the reasonable interpretation hereof.

What is claimed is:

1. A liquid crystal optical switching device; said device comprises:
   a first transparent member, said first transparent member having a liquid crystal material overlying a first base surface thereof;
   with said first transparent member having a triangular cross section with first and second side surfaces directed from said first base surface at included angles to cause said first and second side surfaces to meet at a common apex of said triangle;
   with said first side surface extending from one end of said first base surface, said first side surface and said first base surface having an included angle at least equal to the critical angle of an incident light beam entering said first transparent member substantially perpendicularly to said first side surface;
   with said second side surface extending from the other end of said first base surface, said second side surface and said first base surface having an included angle at least equal to said critical angle whereby said incident light beam, when reflected by said liquid crystal material, is immediately directed substantially perpendicularly toward said second side surface;
   means for attaching an optical fiber to each of said side surfaces including a bead lens for collimating a light beam passing through said fibers; and
   means for switching said incident light beam passing through said fiber attached to said first surface to said fiber attached to said second surface.

2. Device as claimed in claim 1 wherein said first base surface and said first and second side surfaces are optically flat.

3. Device as claimed in claim 1 further comprising:
   a second transparent member having a second base surface thereof opposing said first base surface of said first transparent member, said liquid crystal material being disposed between said base surfaces of said first and second transparent members;
   a third side surface, said third side surface extending from one end of said second base surface, said third side surface and said second base surface having an included angle at least equal to the critical angle of an incident light beam entering said second transparent member substantially perpendicularly to said third side surface;
   a fourth side surface, said fourth side surface extending from the other end of said second base surface, said fourth side surface and said second base surface having an included angle at least equal to said critical angle whereby said incident light beam, when reflected by said liquid crystal material, is immediately directed substantially perpendicularly toward said fourth side surface.

4. Device as claimed in claim 3 further comprising:
   means, associated with each said optical fiber receiving means, for collimating a light beam.

5. Device as claimed in claim 4 wherein each said light beam colimating means is a bead lens.

6. Device as claimed in claim 4 wherein said light beam switching means includes:
   means for selectively establishing an electromagnetic field in said liquid crystal material.

7. Device as claimed in claim 6 wherein said electromagnetic field establishing means comprises:
   a first electrode, said first electrode overlying said first base surface of said first transparent member; and
   a second electrode, said second electrode overlying said second base surface of said second transparent member.

8. Device as claimed in claim 7 further comprising:
   means for impressing a control voltage on said first and second electrodes whereby the refractive index of said liquid crystal material is changed, said change being dependent upon the magnitude and polarity of said control voltage.

9. Device as claimed in claim 7 further comprising:
   means, between said first and said second electrode and said liquid crystal material, for matching the refractive indices thereof.

10. Device as claimed in claim 9 further comprising:
    means, between said first electrode and said first transparent member, for matching the refractive indices thereof; and
    means, between said second electrode and said second transparent member, for matching the refractive indices thereof.

11. A liquid crystal optical switching device comprising:
    a first transparent member, said first transparent member having a liquid crystal material overlying a first base surface thereof with said first transparent member having an isosceles triangular cross section with first and second side surfaces being equilateral and directed from said first base surface at included angles to cause said first and second side surfaces to meet at a common apex of said triangle;
    with said first side surface extending from one end of said first base surface, said first side surface and said first base surface having an included angle at least equal to the critical angle of an incident light beam entering said first transparent member substantially perpendicularly to said first side surface;
    with said second side surface extending from the other end of said first base surface, said second side surface and said first base surface having an included angle at least equal to said critical angle whereby said incident light beam, when reflected by said liquid crystal material, is immediately directed substantially perpendicularly toward said second side surface by a single reflection;
    means for switching at least a poriton of said incident light beam toward said second side surface;
    a second transparent member having a second base surface thereof opposing said first base surface of said first transparent member, said liquid crystal material being disposed between said base surfaces of said first and second transparent members;

a third side surface, said third side surface extending from one end of said second base surface, said third side surface and said second base surface having an included angle at least equal to the critical angle of an incident light beam entering said second transparent member substantially perpendicularly to said third side surface;

a fourth side surface, said fourth side surface extending from the other end of said second base surface, said fourth side surface and said second base surface having an included angle at least equal to said critical angle whereby said incident light beam, when reflected by said liquid crystal material, is immediately directed substantially perpendicularly toward said fourth side surface;

said second transparent member having an isosceles triangular cross-section with said third and fourth side surfaces being equilateral.

* * * * *